United States Patent
Wildash

(10) Patent No.: US 7,342,386 B2
(45) Date of Patent: Mar. 11, 2008

(54) MULTIPHASE POWER CONVERTER HAVING BALANCED CURRENTS

(75) Inventor: Kevin Wildash, Shenzhen (CN)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 11/431,844

(22) Filed: May 10, 2006

(65) Prior Publication Data

US 2007/0262758 A1    Nov. 15, 2007

(51) Int. Cl.
G05F 1/59     (2006.01)
G05F 1/613    (2006.01)

(52) U.S. Cl. .................. 323/272; 323/225; 363/65

(58) Field of Classification Search ............... 323/225, 323/268, 271, 272, 282, 284, 285; 363/65; 307/52, 58
See application file for complete search history.

(56) References Cited

U.S. PATENT DOCUMENTS

| | | | |
|---|---|---|---|
| 5,012,400 A | 4/1991 | Yasuda | |
| 5,495,164 A | 2/1996 | Heng | |
| 6,229,291 B1* | 5/2001 | Matsumura et al. | 323/282 |
| 6,642,695 B1 | 11/2003 | Huang | |
| 6,674,273 B2* | 1/2004 | Oglesbee | 323/284 |
| 6,836,103 B2* | 12/2004 | Brooks et al. | 323/282 |

FOREIGN PATENT DOCUMENTS

| | | |
|---|---|---|
| CN | 1265479 | 9/2000 |
| JP | 9-182425 | 7/1997 |

* cited by examiner

*Primary Examiner*—Gary L Laxton
(74) *Attorney, Agent, or Firm*—Harness, Dickey & Pierce, P.L.C.

(57) ABSTRACT

A power converter includes multiple phase circuits, each phase circuit includes a power switch for delivering power to an output of the power converter, a current sensor connected to the power switch for sensing a current in the power switch, a duty cycle controller having an output connected to the current sensor, and a low pass filter connected to the current sensor. The low pass filter is configured to produce a substantially direct current signal proportional to the average current in the power switch. Further, the duty cycle controller is configured to receive the direct current signal and control a duty cycle of the power switch in response to the direct current signal thereby balancing the currents in the phase circuits.

20 Claims, 3 Drawing Sheets

MULTIPHASE POWER CONVERTER HAVING BALANCED CURRENTS

FIELD

The present disclosure relates to multiphase power converters, including multiphase power converters having balanced currents.

BACKGROUND

The statements in this section merely provide background information related to the present disclosure and may not constitute prior art.

Various multiphase power converters are known having a plurality of phase circuits connected in parallel. Typically, each phase circuit includes a power switch for delivering power to an output load, and a duty cycle controller for controlling the duty cycle of the power switch. These known designs commonly allow input current to be split among the phase circuits, thereby increasing the efficiency of the power converter. In addition, operating the phase circuits at different phase angles can cancel input and output ripple currents of the power converter.

However, the benefits of efficiency and cancellation of the input and output ripple currents can be compromised if the currents in the phase circuits are not balanced. Differences in the resistances of circuit elements such as switches, inductors and printed circuit board trace resistances can cause such unbalanced currents.

Various designs are known that attempt to balance the currents in the phase circuits. For example, some power converters utilize a peak current mode control which attempts to directly control the peak current in each phase circuit.

FIG. 1 illustrates a boost converter 100 implementing the peak current mode control. The boost converter 100 includes a DC input V1 connected to three phase circuits 102a-c, and a synchronous generator 104 which synchronizes each phase circuit 102a-c to operate at a phase angle difference of 120 degrees with respect to the other phase circuits. In addition, the boost converter 100 includes a diode D4, an output load R11, resistors R9 and R10 and a capacitor C4.

The phase circuit 102a includes an inductor L1, switches Q1 and Q2, a power switch Q3, resistors R2-R6 and R8, diodes D1-D3, capacitors C2-C3 and a duty cycle controller IC1. The duty cycle controller IC1 includes an internal voltage error amplifier (not shown), an output pin of the voltage error amplifier COMP, a current sense pin ISNS, an inverting input pin of the voltage error amplifier VFB, an oscillator pin RT/CT, a reference voltage pin VREF and an output pin VOUT which is connected to the power switch Q3 for controlling the duty cycle of the power switch Q3 (i.e., the on-time and the off-time of the power switch Q3). The circuit elements in the phase circuit 102a are identical to the circuit elements in the phase circuits 102b-c, with the exception being that the phase circuits 102b-c do not include the resistor R8 and the capacitor C3.

During operation of the power converter 100, a voltage divider, formed by the resistors R9 and R10, provides a sample of the voltage at the output load R11, which is input into the duty cycle controller IC1 of the phase circuit 102a. The internal voltage error amplifier of the phase circuit 102a calculates and outputs an error voltage signal, which is an amplified difference of the sampled voltage and an internal reference voltage (typically 2.5V). The COMP pin is connected to the output of the internal voltage error amplifier, and thus receives the error voltage signal. The COMP pin of the phase circuit 102a is also connected to the COMP pins of the phase circuits 102b-c. Thus, the error voltage signal for all three phase circuits is substantially the same voltage.

In addition, the current transformer T1 senses a current in the power switch Q3, and a voltage signal proportional to the current in the power switch Q3 is input into the ISNS pin via the diode D1 and the resistor R2. The duty cycle controller IC1 compares the voltage signal at the ISNS pin with a current limiting signal, which is a voltage proportional to the error voltage signal. The power switch Q3 is turned off when the voltage at the ISNS pin is equal to, or exceeds, the current limiting signal.

As recognized by the inventor, however, a disadvantage to the peak current control mode is that the boost converter 100 is inherently unstable when the source impedance is significantly inductive. One known solution is to add a large capacitor, which can be expensive and bulky, across the DC input V1.

Another solution to the instability problem has been to implement a voltage mode control which is illustrated by a boost converter 200 shown in FIG. 2. The boost converter 200 has the DC input V1 connected to three phase circuits 202a-c and the synchronous generator 104 which synchronizes the phase circuits 202a-c to operate at a phase angle difference of 120 degrees with respect to the other phase circuits. In addition, the boost converter 200 includes the diode D4, the output load R11, the resistors R9 and R10 and the capacitor C4.

As shown in FIG. 2, the phase circuit 202a includes the inductor L1, the switches Q1 and Q2, the power switch Q3, the resistors R4, R6-R8 and a resistor R12, the capacitors C2-C3 and the duty cycle controller IC1. The circuit elements in the phase circuit 202a are identical to the circuit elements in the phase circuits 202b-c, with the exception being that the phase circuits 202b-c do not include the resistor R8 and the capacitor C3.

Unlike the peak current mode control, the phase circuits 202a-c do not include a current sensor. Instead, during operation of the boost converter 200, an oscillating waveform signal at the RT/CT pin of the duty cycle controller IC1 is buffered by the switch Q2 and is input into the ISNS pin of the duty cycle controller IC1 via a voltage divider formed by the resistors R7 and R12. The voltage at the ISNS pin is then compared with the current limiting signal. When the voltage of the oscillating waveform signal is equal to, or exceeds the current limiting signal, the power switch Q3 is turned off.

As recognized by the inventor, however, a disadvantage to the voltage mode control is that the currents in the phase circuits 202a-c are poorly balanced, mainly due to slight mismatches between various circuit elements in each phase circuit 202a-c including the duty cycles of each duty cycle controller IC1, the resistances of each of the power switches Q3 and the resistances of each of the inductors L1.

In addition to the peak current mode control and the voltage mode control, other designs are known which attempt to balance phase circuit currents. These designs typically require current comparison circuits such as current error amplifiers, which add to the complexity and/or reduce the efficiency of the power converter.

SUMMARY

Further areas of applicability will become apparent from the description provided herein. It should be understood that the description and specific examples are intended for purposes of illustration only and are not intended to limit the scope of the present disclosure.

According to one aspect of the present disclosure, a power converter includes multiple phase circuits, each phase circuit includes a power switch for delivering power to an output of the power converter, a current sensor connected to the power switch for sensing a current in the power switch, a duty cycle controller having an output connected to the current sensor, and a low pass filter connected to the current sensor. The low pass filter is configured to produce a substantially direct current signal proportional to the average current in the power switch. Further, the duty cycle controller is configured to receive the direct current signal and control a duty cycle of the power switch in response to the direct current signal thereby balancing the currents in the phase circuits.

According to another aspect of the present disclosure, a method for balancing the currents in a power converter, the method includes providing multiple phase circuits, each phase circuit having a power switch, a current sensor, a low pass filter and a duty cycle controller. The method further includes producing a substantially direct current signal proportional to an average current in the power switch, and substantially balancing currents in the phase circuits in response to the substantially direct current signal.

According to yet another embodiment of the present disclosure, a power converter includes three phase circuits operating at a phase angle difference of about 120 degrees, each phase circuit includes a power switch for delivering power to an output of the power converter, a current transformer for sensing a current in the power switch, a low pass filter and a duty cycle controller. The power switch is connected to the current transformer and an output of the duty cycle controller, the current transformer is connected to the low pass filter, and the low pass filter is connected to the duty cycle controller. Further, the low pass filter is configured to produce a substantially direct current signal proportional to the average current in the power switch, and the duty cycle controller is configured to receive the direct current signal. The duty cycle controller controls a duty cycle of the power switch in response to the direct current signal thereby balancing the currents in the phase circuits.

DRAWINGS

The drawings described herein are for illustration purposes only and are not intended to limit the scope of the present disclosure in any way.

DETAILED DESCRIPTION

Figure 1:
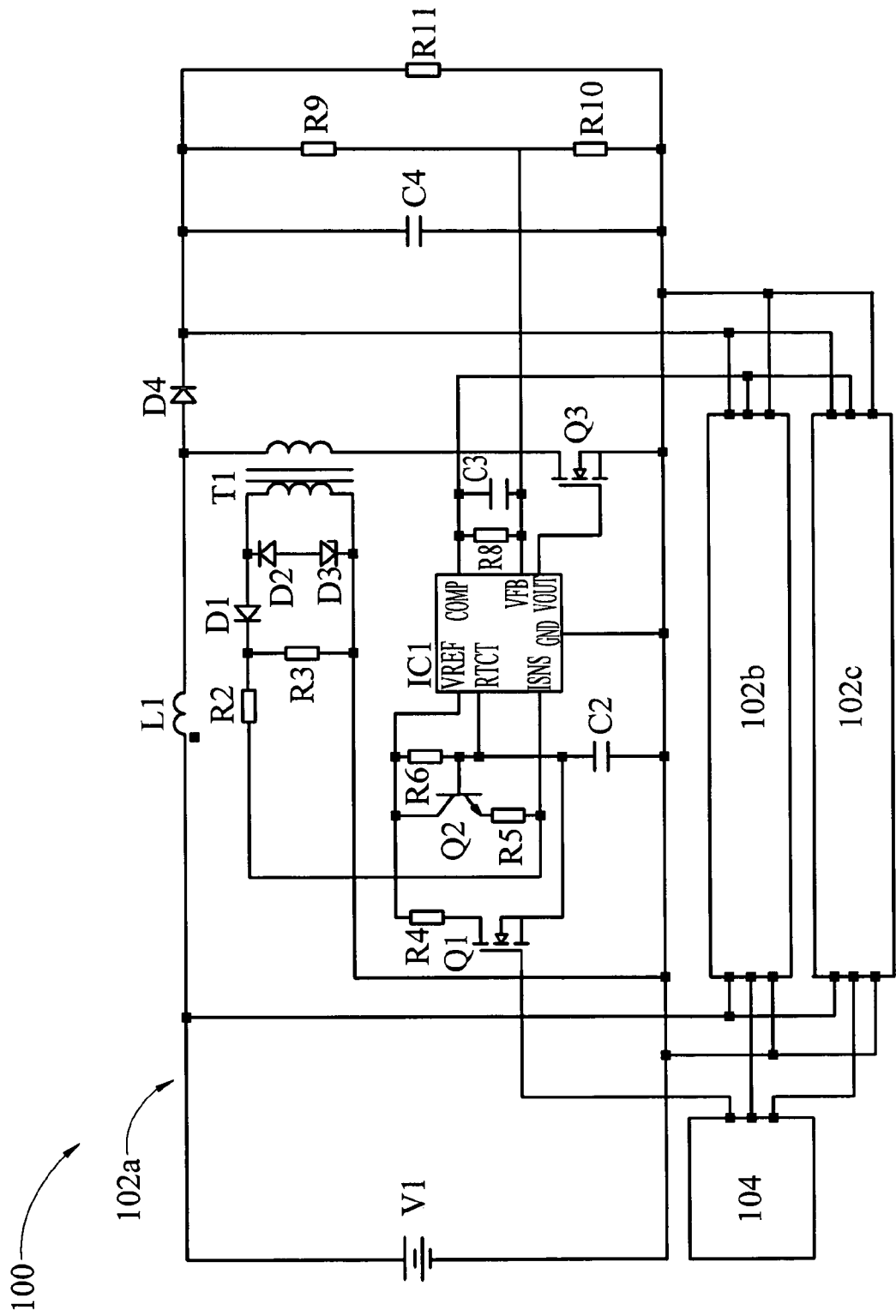
FIG. 1 is a prior art circuit diagram of a boost converter.
Figure 2:
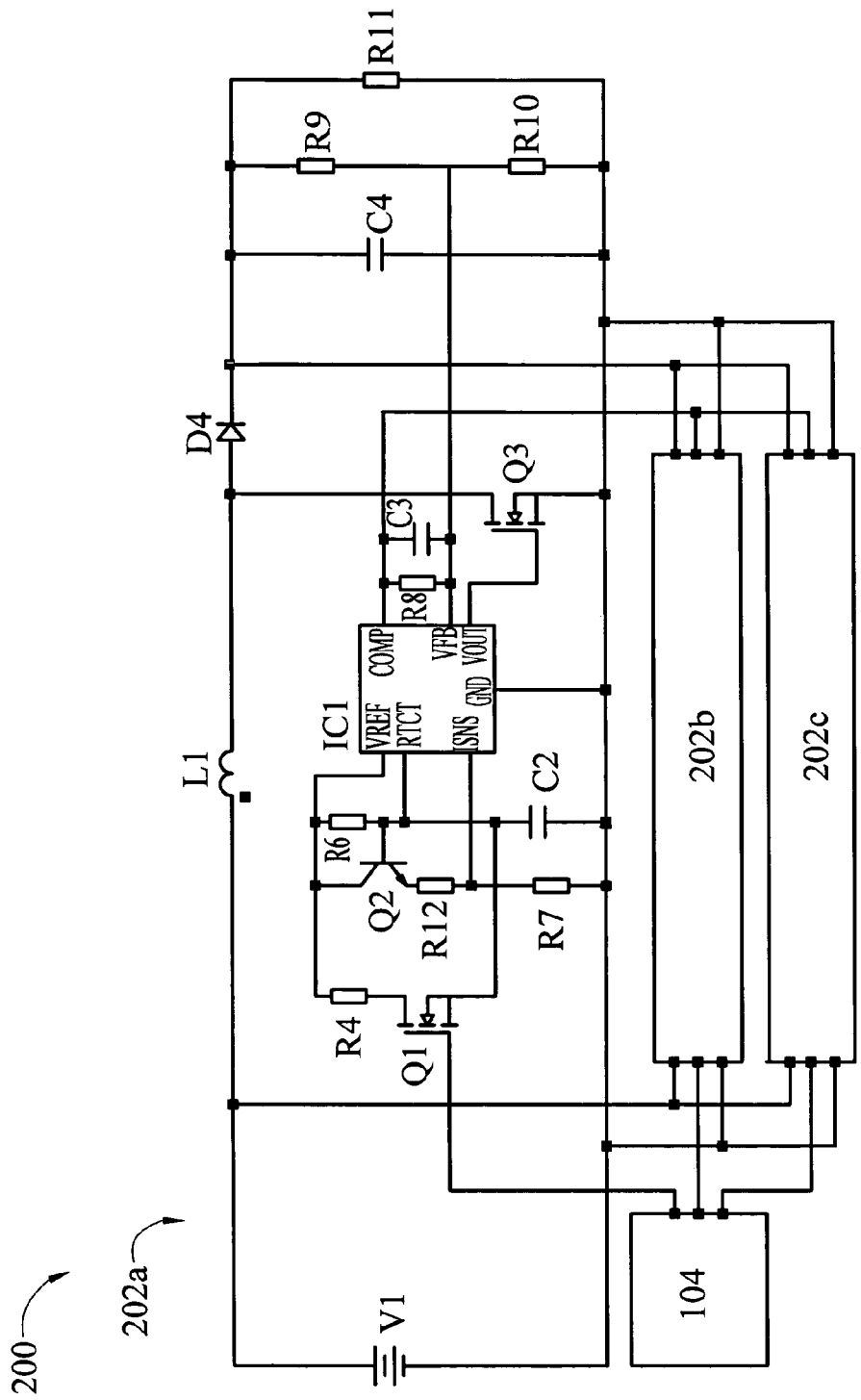
FIG. 2 is another prior art circuit diagram of a boost converter.

Illustrative embodiments of the present disclosure are described below. In the interest of clarity, not all features of an actual implementation are described in this specification. It will be appreciated that in the development of any actual embodiment, numerous implementation-specific decisions must be made to achieve specific goals, such as performance objectives and compliance with system-related, business-related and/or environmental constraints. Moreover, it will be appreciated that such development efforts may be complex and time-consuming, but would nevertheless be a routine undertaking for those of ordinary skill in the art having the benefit of this disclosure.

According to one aspect of the present disclosure, a power converter includes multiple phase circuits, each phase circuit includes a power switch for delivering power to an output of the power converter, a current sensor connected to the power switch for sensing a current in the power switch, a duty cycle controller having an output connected to the current sensor, and a low pass filter connected to the current sensor. The low pass filter is configured to produce a substantially direct current signal proportional to the average current in the power switch. Further, the duty cycle controller is configured to receive the direct current signal and control a duty cycle of the power switch in response to the direct current signal thereby balancing the currents in the phase circuits.

An exemplary boost converter indicated generally by reference numeral 300 incorporating the aspect of the disclosure noted immediately above will now be described with reference to FIG. 3. The boost converter 300 includes the DC input V1 connected to three phase circuits 302a-c and the synchronous generator 104 which synchronizes the phase circuits 302a-c to operate at a phase angle difference of about 120 degrees with respect to the other phase circuits. In addition, the boost converter 100 includes the diode D4, the output load R11, the resistors R9 and R10 and the capacitor C4.

The phase circuit 302a includes the inductor L1, the switches Q1 and Q2, the power switch Q3, the resistors R2-R4, R6-R8 and R12, the diodes D1-D3, the capacitors C2-C3 and the duty cycle controller IC1. Further, the phase circuit 302a also includes a resistor R1 and low pass filter 304 comprising the resistor R2 and a capacitor C1. These circuit elements are identical to the circuit elements in the phase circuits 302b-c, with the exception being that the phase circuits 302b-c do not include the resistor R8 and the capacitor C3.

Similar to the voltage mode control, during operation of the boost converter 300, the oscillating waveform signal at the RT/CT pin of the duty cycle controller IC1 is buffered by the switch Q2 and is input into the ISNS pin of the duty cycle controller IC1 via a voltage divider formed by the resistors R7 and R12.

Additionally, the current transformer T1 senses the current in the power switch Q3 and the low pass filter 304 receives a signal proportional to the current in the power switch Q3 via the diodes D1-D3 and the resistor R3. It should be noted that the low pass filter 304 has a time constant (i.e., resistor R2·capacitor C1) that is longer, typically more than 100 times longer, than the switching period of the power switch Q3. As a result, the voltage across C1 is a substantially direct current (DC) signal proportional to the average current in the power switch Q3. The DC signal is divided by the resistors R1 and R7 and added to the oscillating waveform signal at the ISNS pin. As shown below, the DC signal for each respective phase circuit 302a-c adjusts the current in each respective phase circuit 302a-c more effectively than the voltage mode control.

For example, in the situation where the current at the output load R11 increases, the phase circuits 302a-c, assuming equal current distribution, should each share one third of the increase in the load current. Accordingly, the DC signal in each phase circuit 302a-c should also increase, thereby increasing the voltage of the oscillating waveform signal in each phase circuit 302a-c. The addition of the DC signal in each phase circuit 302a-c will cause the oscillating waveform signal in each phase circuit 302a-c to equal or exceed the current limiting signal quicker than the boost converter 200 operating in the voltage mode control.

Furthermore, in the situation where there is an increase in the resistance of the power switch Q3 in the phase circuit 302a, the current in the phase circuit 302a should decrease, which will cause a corresponding decrease of the DC signal. The decrease of the DC signal will cause a decrease in the voltage of the oscillating waveform signal at the ISNS pin. As a result, the oscillating waveform signal will equal or exceed the current limiting signal more slowly than the boost converter 200 operating in the voltage mode control. Accordingly, the power switch Q3 will remain on longer causing an increase in the current in the phase circuit 302a.

In some embodiments, the error voltage signal can change relatively slowly compared with the switching frequency of the power switch Q3. Further, the DC signal can vary still more slowly so that the change in the duty cycle that the DC signal causes is so slow that the duty cycle appears constant over consecutive switching periods.

In addition to adjusting the currents in the phase circuits 302a-c, it can be seen that the DC signal also balances the currents in each of the phase circuits 302a-c. More specifically, the error voltage signal for each of the phases 302a-c is substantially the same since the output of the internal voltage error amplifier is connected to the COMP pins of all the phase circuits 302a-c. As a result, the current limiting signal is also substantially the same for each of the phases 302a-c since the current limiting signal is proportional to the error voltage signal. However, the DC signal for each respective phase circuit 302a-c can be different because each DC signal is proportional to the current in each respective power switch Q3. As a result, the DC signals for each respective phase circuit 302a-c can independently correct current increases or decreases in each respective power switch Q3. This independent correction of the current in each respective power switch Q3 has the effect of balancing the currents in the phase circuits 302a-c.

In contrast to the voltage mode control of the prior art, the currents in the phases 302a-c can remain balanced despite mismatches in the resistances of each of the power switches Q3 and the resistances of inductor L1. Additionally, in contrast to the peak current mode control of the prior art, the boost converter 300 can remain stable even when the source impedance is significantly inductive. Thus, the boost converter 300 can eliminate the need for an expensive and bulky capacitor across the DC input V1.

Figure 3:
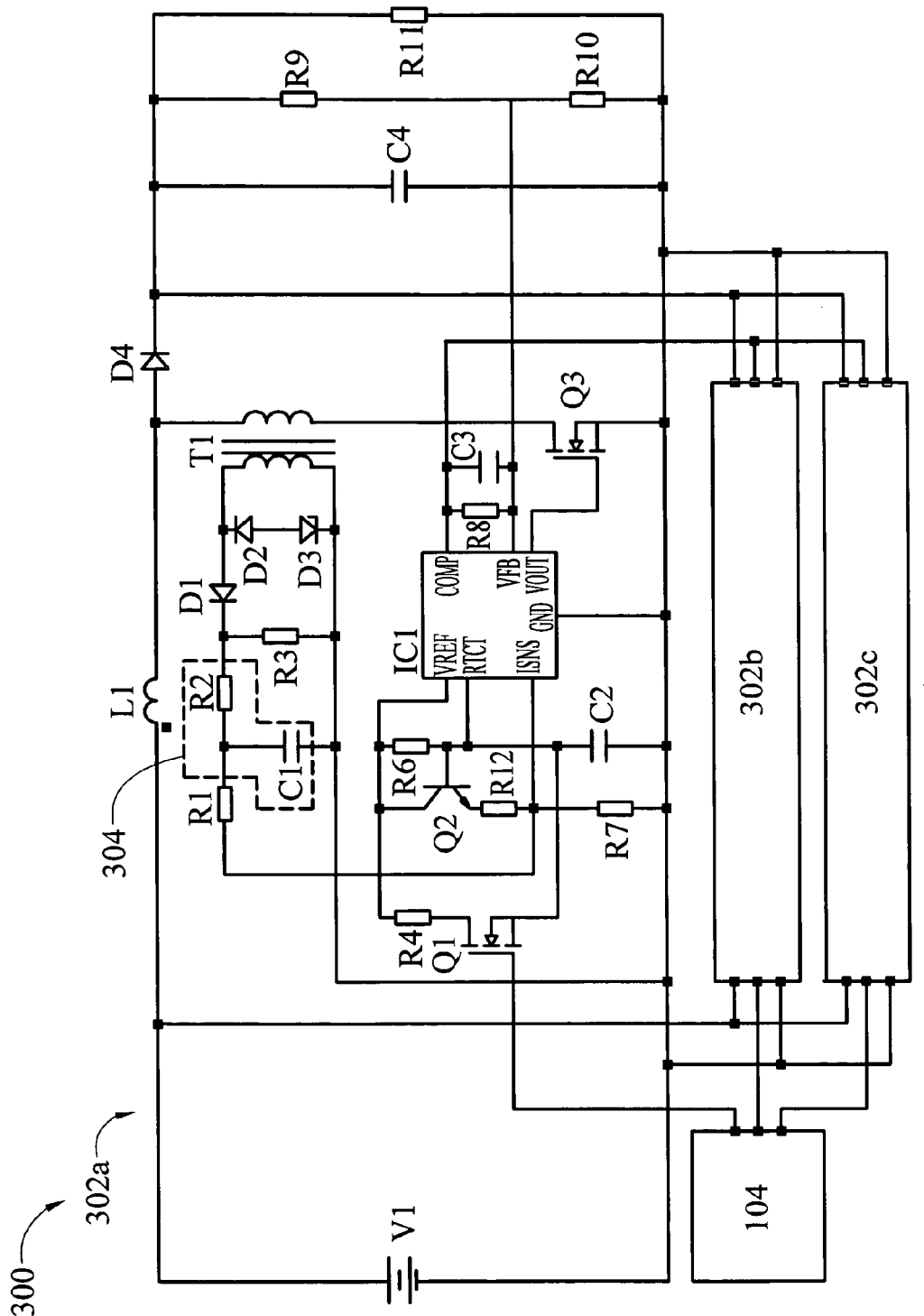
FIG. 3 is a circuit diagram of a boost converter according to various embodiments of the present disclosure.

Although FIG. 3 illustrates the low pass filter 304 comprising a resistor and a capacitor to produce the DC signal, it should be understood that other suitable filters can be used for producing the DC signal. For example, an active filter that uses an operational amplifier in combination with several resistors and capacitors to produce the DC signal can be used without departing from the scope of this disclosure.

Additionally, although the boost converter 300 has three phase circuits 302a-c, it should be understood that more or fewer than three phase circuits can be employed without departing from the scope of this disclosure. Furthermore, although each phase circuit in the boost converter 300 is operated at a phase angle difference of 120 degrees, it should be understood that the phase circuits 302a-c can be operated at any phase angle difference, or can be operated in phase without departing from the scope of this disclosure. It should be noted that operating the phases at a phase angle difference of 360/N, where N is the number of phases, can yield the maximum cancellation of the input and output ripple currents.

Moreover, although FIG. 3 illustrates a boost converter, it should be understood that the teachings of this disclosure are not limited to such converters. For example, the teachings of the present disclosure could be applied to other suitable power converters, such as non-isolated buck converters, single-ended forward converters, single-ended flyback converters, half bridge converters, and full bridge converters, without departing from the scope of this disclosure.

The power switch Q3 can be a MOSFET or other suitable switching elements such as a bipolar junction transistor (BJT), an insulated gate bipolar transistor (IGBT), or any power switching device which may be controlled between on and off states, without departing from the scope of this disclosure.

Further, the duty cycle controller IC1 can be any suitable pulse width modulation (PWM) controller, although the present disclosure is not so limited. For example, the boost converter 300 can be a self-oscillating power converter and thus would not need a PWM controller.

Although FIG. 3 illustrates a current transformer T1, it should be understood that other suitable current sensing devices, such as a current sense resistor or a Hall effect sensor could be employed without departing from the scope of this disclosure.

In some embodiments, the boost converter 300 can have an input voltage range of at least 20V to 60V and can handle a range of power from 500 W to over 1 kW. Also, the boost converter 300 can have a significant holdup time of several milliseconds at minimum input voltage and full power. The boost converter 300 can also be placed in an enclosure with all heat being dissipated through a baseplate heat sink.

What is claimed is:

1. A power converter including multiple phase circuits, each phase circuit comprising:
   a power switch for delivering power to an output of the power converter,
   a current sensor connected to the power switch for sensing a current in the power switch,
   a duty cycle controller having an output connected to the current sensor, and
   a low pass filter connected to the current sensor,
   the low pass filter configured to produce a substantially direct current signal proportional to the average current in the power switch and wherein the duty cycle controller is configured to receive the direct current signal and control a duty cycle of the power switch in response to the direct current signal, and independent of any comparison of currents from the other phase circuits, thereby balancing the currents in the phase circuits.

2. The power converter of claim 1 wherein the low pass filter is a resistor-capacitor circuit.

3. The power converter of claim 2 wherein a time constant of the resistor-capacitor circuit is longer than a switching period of the power switch.

4. The power converter of claim 3 wherein the time constant is more than 100 times longer than the switching period.

5. The power converter of claim 1 wherein the power converter comprises three phase circuits.

6. The power converter of claim 5 wherein the three phase circuits operate at a phase angle difference of about 120 degrees.

7. The power converter of claim 1 wherein the phase circuits operate at a phase angle difference of 360/N degrees, where N is the number of phases.

8. The power converter of claim 1 wherein the current sensor is a current transformer.

9. The power converter of claim 1 wherein the duty cycle controller is a pulse width modulation controller.

10. The power converter of claim 1 wherein the power switch is a MOSFET.

11. The power converter of claim 1 wherein the power converter is a boost converter.

12. A method for balancing the currents in a power converter, the method comprising:
providing multiple phase circuits, each phase circuit having a power switch, a current sensor, a low pass filter and a duty cycle controller,
producing a substantially direct current signal proportional to an average current in the power switch, and
substantially balancing currents in the phase circuits in response to the substantially direct current signal and independent of any comparison of currents from the other phase circuits.

13. The method of claim 12 further comprising sensing a current in the power switch and generating a current signal proportional to the current.

14. The method of claim 13 further comprising receiving in the low pass filter the current signal proportional to the current.

15. The method of claim 14 further comprising producing the substantially direct current signal in the low pass filter and outputting the substantially direct current signal from the low pass filter to the duty cycle controller.

16. A power converter comprising:
three phase circuits operating at a phase angle difference of about 120 degrees, each phase circuit including a power switch for delivering power to an output of the power converter, a current transformer for sensing a current in the power switch, a low pass filter and a duty cycle controller,
the power switch connected to the current transformer and an output of the duty cycle controller, the current transformer connected to the low pass filter, and the low pass filter connected to the duty cycle controller such that the low pass filter is configured to produce a substantially direct current signal proportional to the average current in the power switch, the duty cycle controller configured to receive the direct current signal and control a duty cycle of the power switch in response to the direct current signal, and independent of any comparison of currents from the other phase circuits, thereby balancing the currents in the phase circuits.

17. The power converter of claim 16 wherein the low pass filter is a resistor-capacitor circuit.

18. The power converter of claim 17 wherein a time constant of the resistor-capacitor circuit is longer than a switching period of the power switch.

19. The power converter of claim 16 wherein the duty cycle controller is a pulse width modulation controller.

20. The power converter of claim 16 wherein the power converter is a boost converter.

* * * * *